Oct. 27, 1959

F. P. WARRICK 2,910,340

HIGH SPEED STRIP RECORDING MEANS FOR TRANSIENT PHENOMENA

Filed Jan. 28, 1953

7 Sheets-Sheet 1

INVENTOR.
FREDERICK P. WARRICK
BY F. O. Hicks
His Attorney

INVENTOR.
FREDERICK P. WARRICK
BY F. O. Hicks
His Attorney

Oct. 27, 1959

F. P. WARRICK

HIGH SPEED STRIP RECORDING MEANS FOR TRANSIENT PHENOMENA 2,910,340

Filed Jan. 28, 1953

7 Sheets-Sheet 3

INVENTOR.

FREDERICK P. WARRICK

BY F. O. Hicks

His Attorney

INVENTOR.
FREDERICK P. WARRICK
BY
His Attorney

INVENTOR.
FREDERICK P. WARRICK
BY F. O. Hicks
His Attorney

Oct. 27, 1959 F. P. WARRICK 2,910,340

HIGH SPEED STRIP RECORDING MEANS FOR TRANSIENT PHENOMENA

Filed Jan. 28, 1953 7 Sheets-Sheet 6

INVENTOR.
FREDERICK P. WARRICK
BY F. O. Hicks
His Attorney

Oct. 27, 1959 F. P. WARRICK 2,910,340

HIGH SPEED STRIP RECORDING MEANS FOR TRANSIENT PHENOMENA

Filed Jan. 28, 1953 7 Sheets-Sheet 7

INVENTOR.
FREDERICK P. WARRICK
BY F. O. Hicks
His Attorney

United States Patent Office 2,910,340

Patented Oct. 27, 1959

2,910,340

HIGH SPEED STRIP RECORDING MEANS FOR TRANSIENT PHENOMENA

Frederick P. Warrick, Bloomfield, Mich.

Application January 28, 1953, Serial No. 333,638

17 Claims. (Cl. 346—108)

The invention pertains to apparatus for making records of transient phenomena in such a manner that events of very short duration can be conveniently and leisurely reproduced and studied and it relates more particularly to apparatus and accessories for making such records upon material provided in the form of a suitably sensitized strip or tape.

Substantial difficulties are encountered in making accurate records of such very short events. One difficult problem is that of accelerating the recording strip up to the very high velocity necessary for recording the impression to be recorded thereon, making an accurate high speed record, and then bringing the strip to rest quickly to avoid wasting a large quantity of the sensitized strip. If a large quantity of the recording strip is wasted it not only adds greatly to the cost of operating the apparatus but also it makes it necessary to have a larger and heavier reel of the strip material which adds still more inertia to be accelerated and decelerated. Previous attempts have often been in the form of laboratory apparatus and difficulties have been encountered in transporting and setting up such apparatus at the locality where the events of interest were about to occur because of the cumbersomeness and complexity of previously available apparatus. And in such operations there is the ever present difficulty of obtaining a reasonably accurate record of such very short and almost instantaneous events.

Accordingly it is an object of my invention to provide improved high-speed recording apparatus which can make a more accurate record of transient phenomena upon a shorter length of the recording strip or tape than has been possible with previously available apparatus.

It is also an object of my invention to provide such strip recording apparatus which is more compact and convenient to handle, transport and set up at the location where transient phenomena are to be observed or recorded.

It is a further object of my invention to provide improved electrical operating and control means whereby such apparatus may be more conveniently and accurately controlled and operated.

Another object of my invention is to provide for such high-speed strip recording apparatus an improved body or base supporting structure which is very rigid and which also provides a compact enclosure for the apparatus.

A further object of my invention is to provide such transient recording apparatus with a reel magazine unit which is conveniently and quickly attachable upon or removable from such apparatus as a unit for easily and quickly substituting additional reels of recording strip or tape.

Also another object of my invention is to provide an improved reel coupling and driving means for connecting with and driving reels of recording tape when installed upon such high-speed tape recording apparatus.

Also a further object of my invention is to provide such high-speed transient recording apparatus which is especially convenient and adaptable for utilizing recording material in the form of recording strips or tape sensitized to be responsive either to light or to a magnetic field varied in accordance with the variable factors of the event being recorded.

It is an additional object of my invention to provide changeable aperture plates which may be advantageously utilized in light recording or photographic apparatus.

Further objects and advantages are within the scope of the invention, such as relate to the arrangement, operation and function of the related elements of the apparatus, to various details of construction and to combinations of parts, elements per se, and to economies of manufacture and numerous other features as will be apparent from a consideration of the specification in conjunction with the drawings disclosing specific embodiments of the invention, having similar reference characters applied to corresponding elements throughout, and in which.

Figures 1, 2, 7, 8, 9, 10:
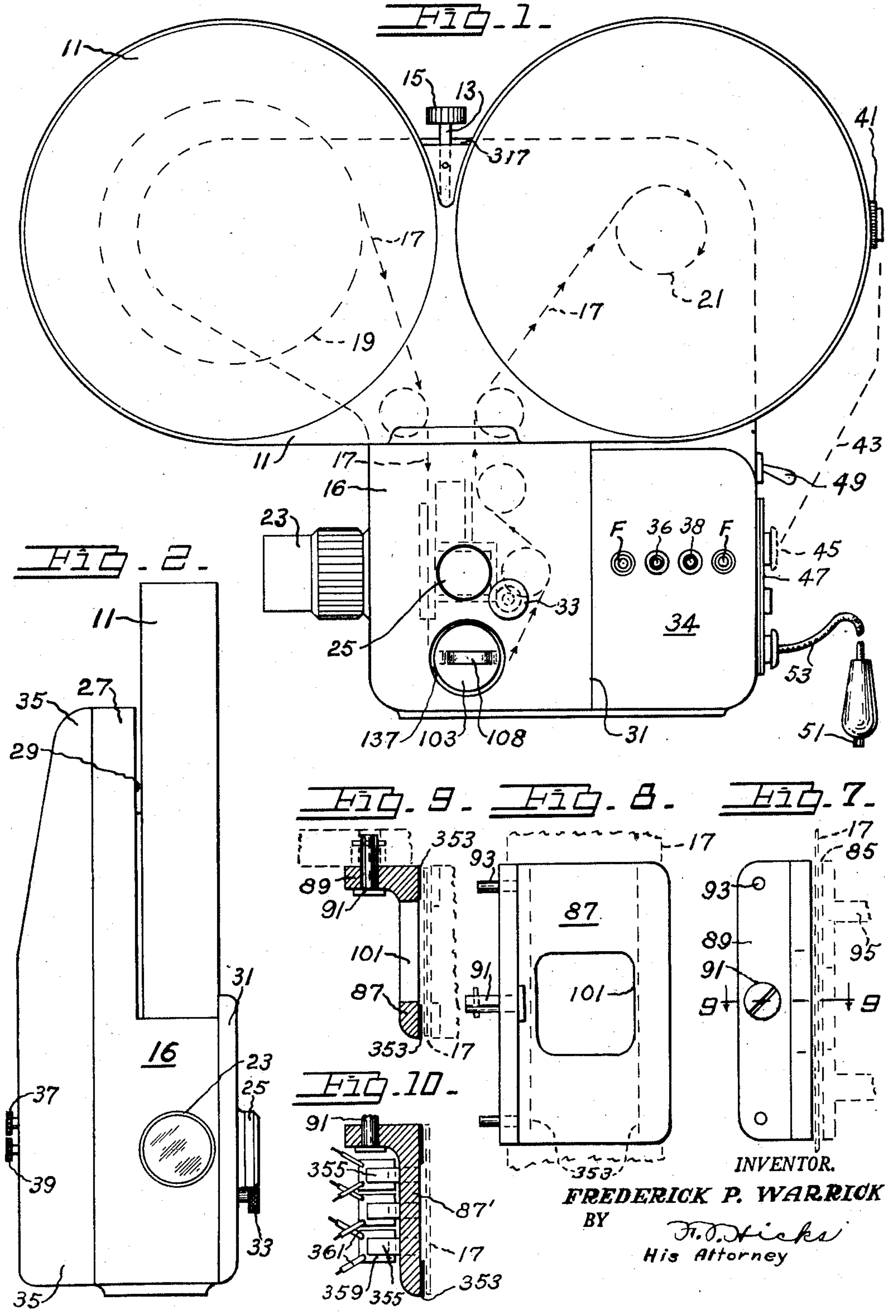
Fig. 1 is a right-hand side elevational view showing the side of the recording apparatus which is to the right hand of the observer standing in front of the apparatus and looking toward the lens thereof, and showing the completely assembled apparatus with some of the cooperative internal parts represented by dotted lines.
Fig. 2 is a front elevational view of the apparatus.
Figures 3, 4, 5:
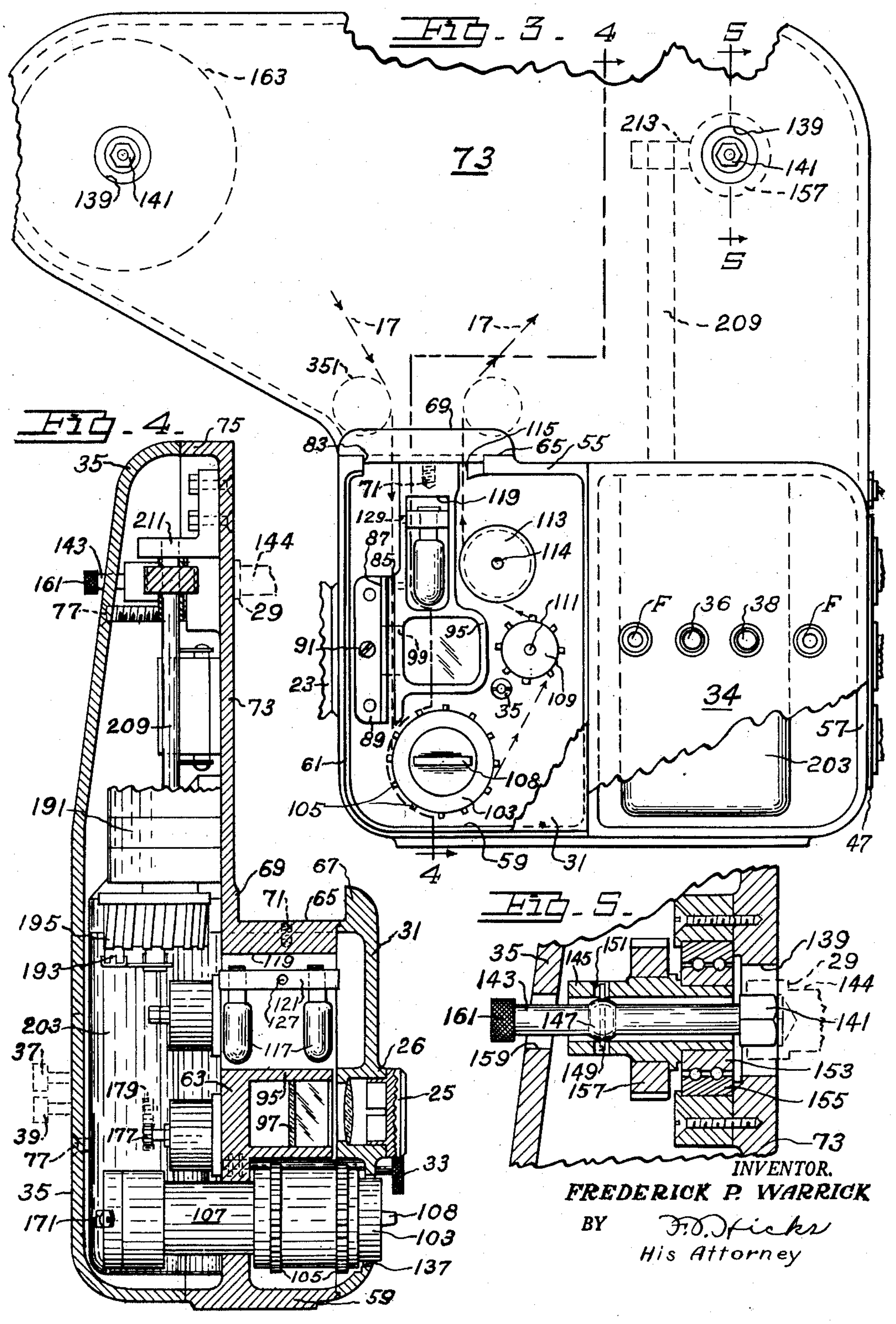
Figures 6, 17:
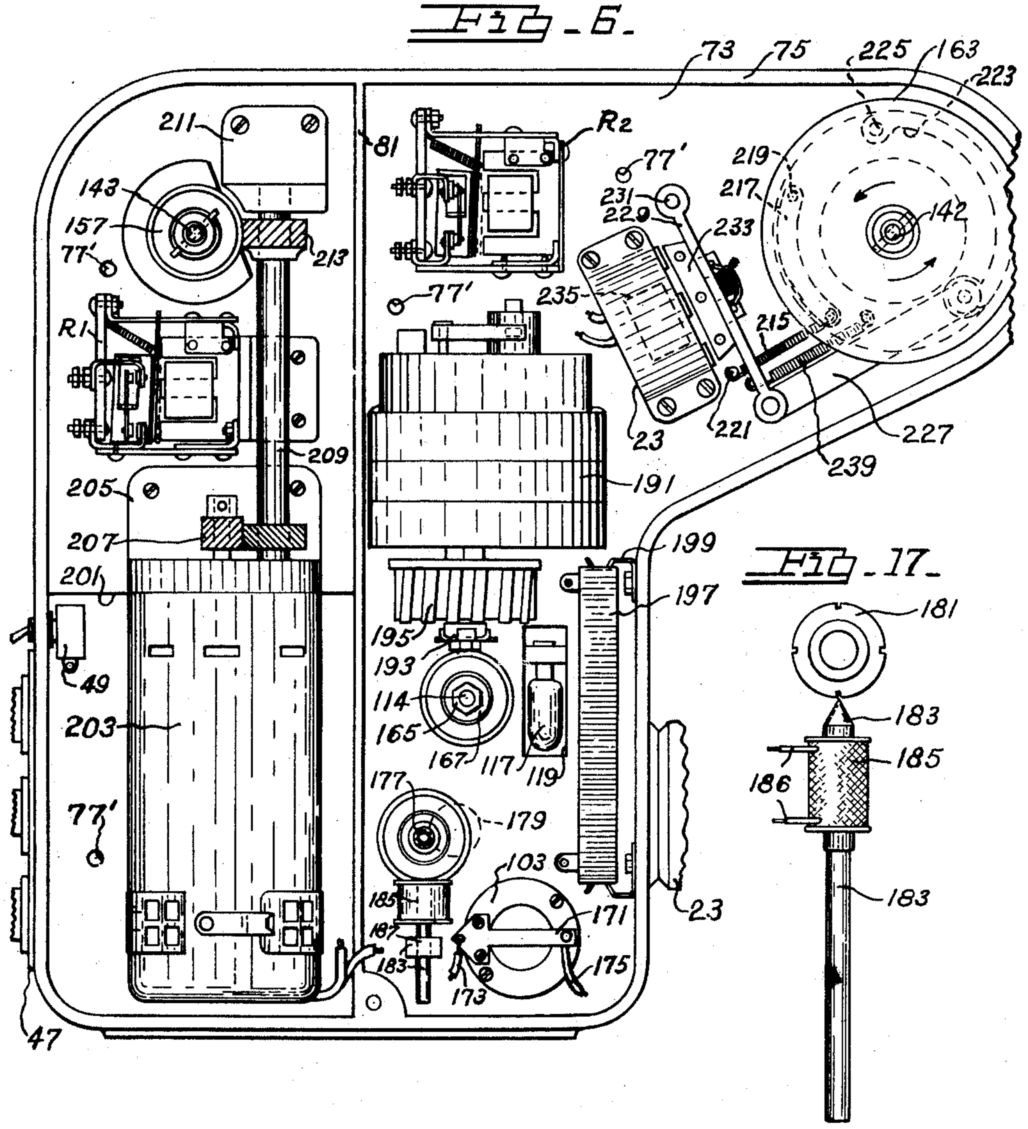
Figure 18:
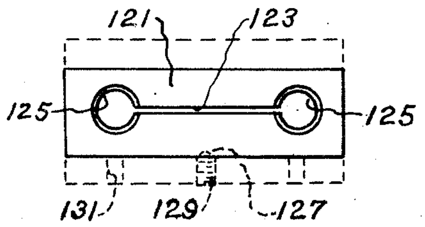
Figures 11, 12, 13, 14, 16:
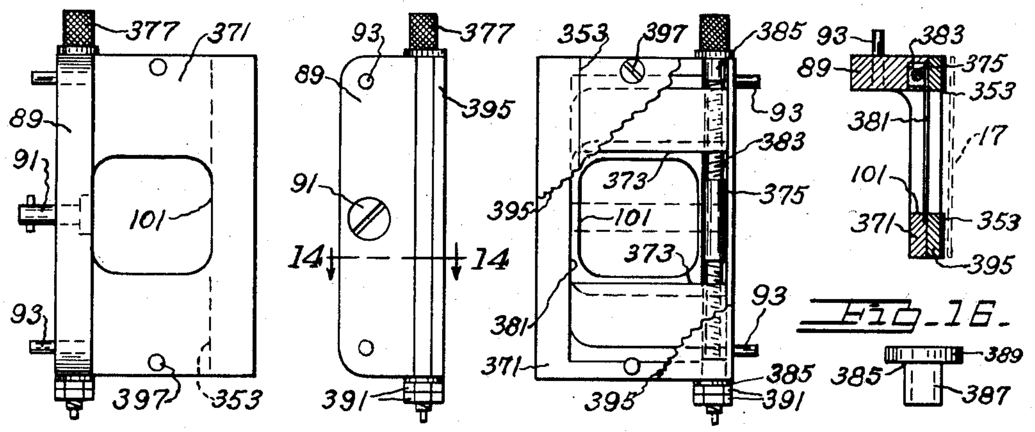
Figure 15:
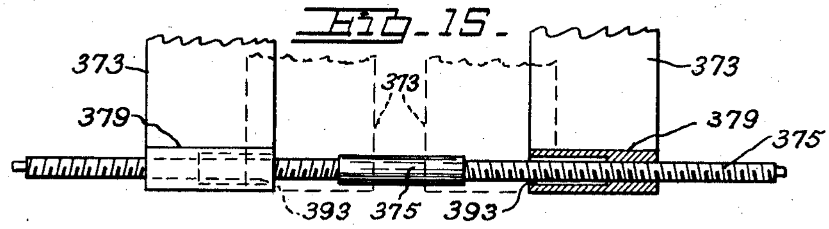
Figure 28:
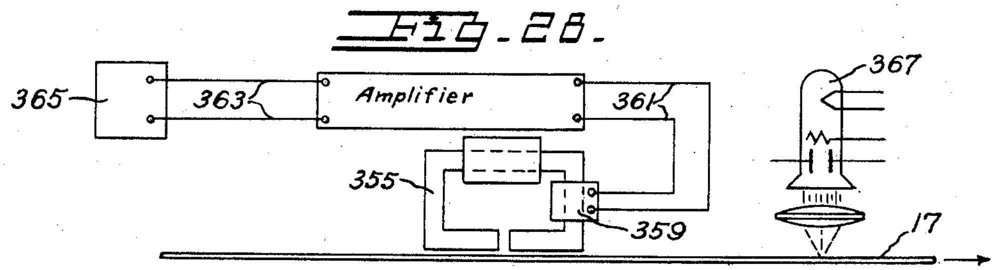
Figure 29:
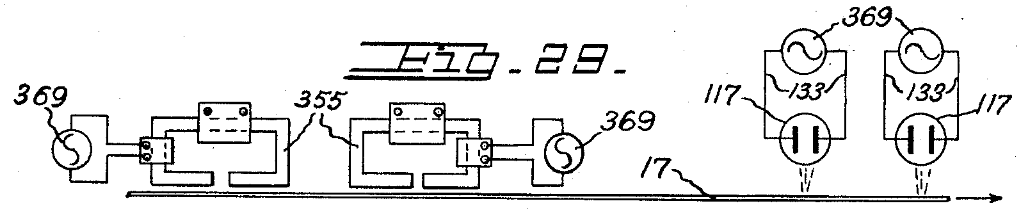
Figures 19, 20, 21, 22, 23:
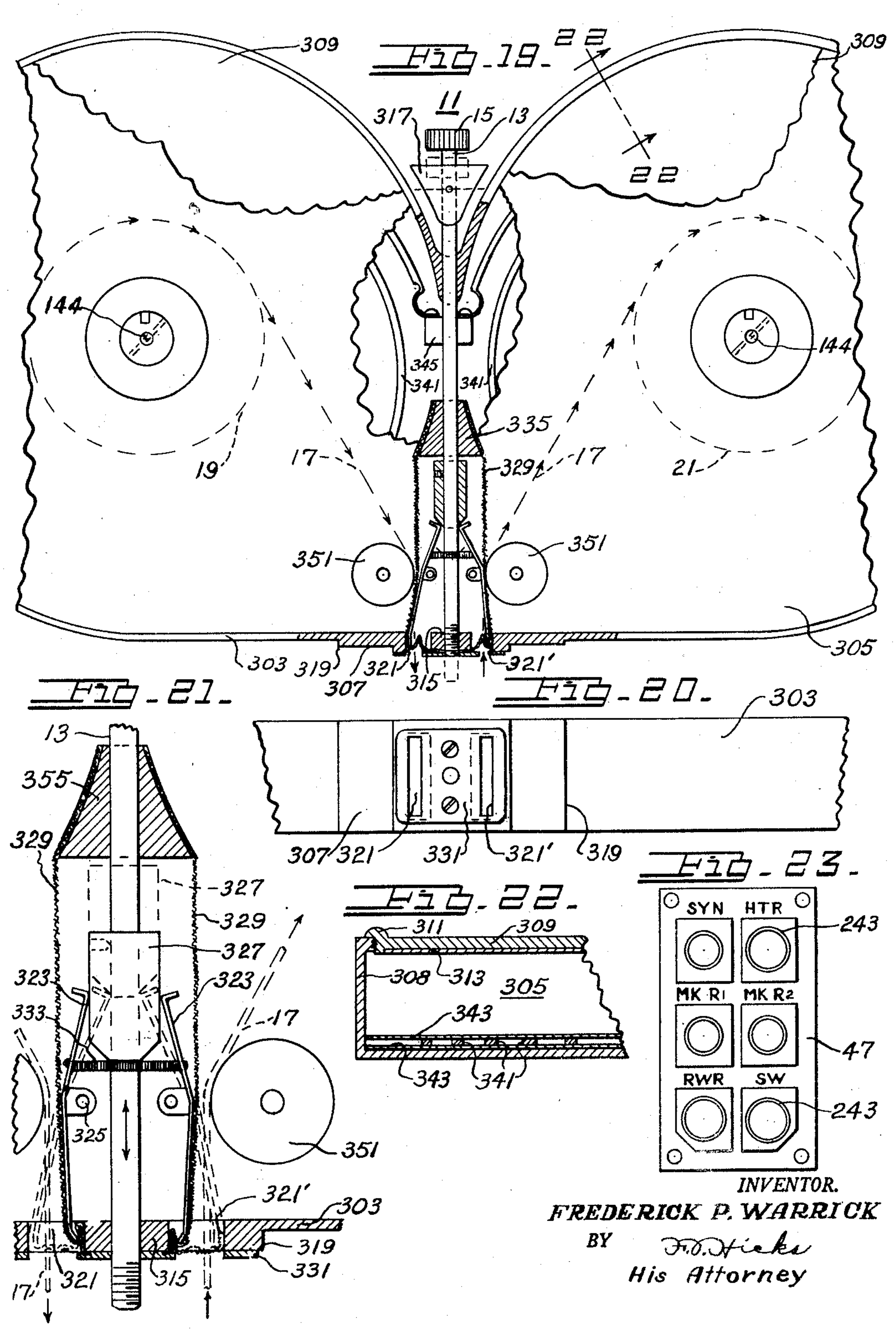
Figures 24, 25, 26, 27:
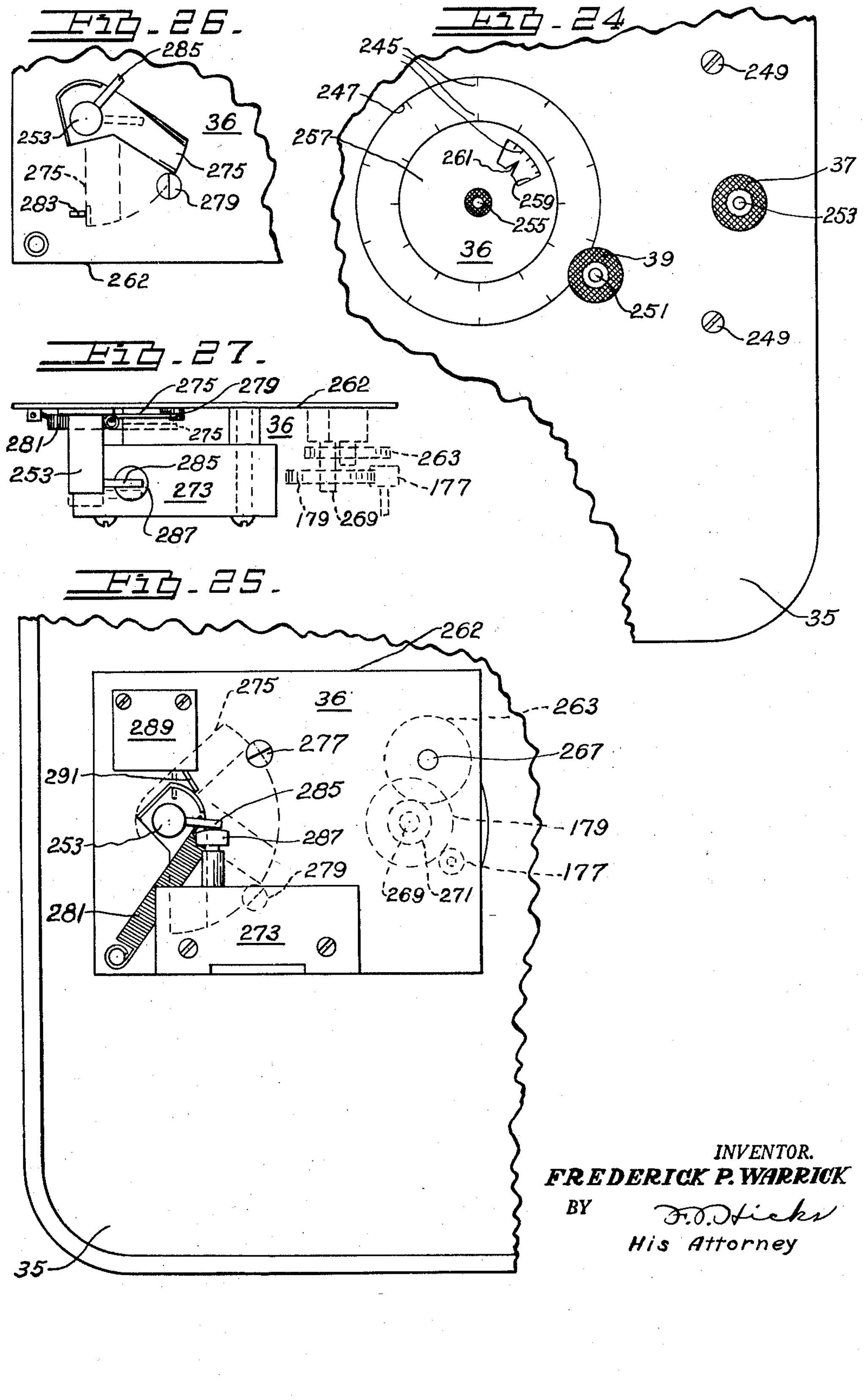
Figures 30, 31, 32:
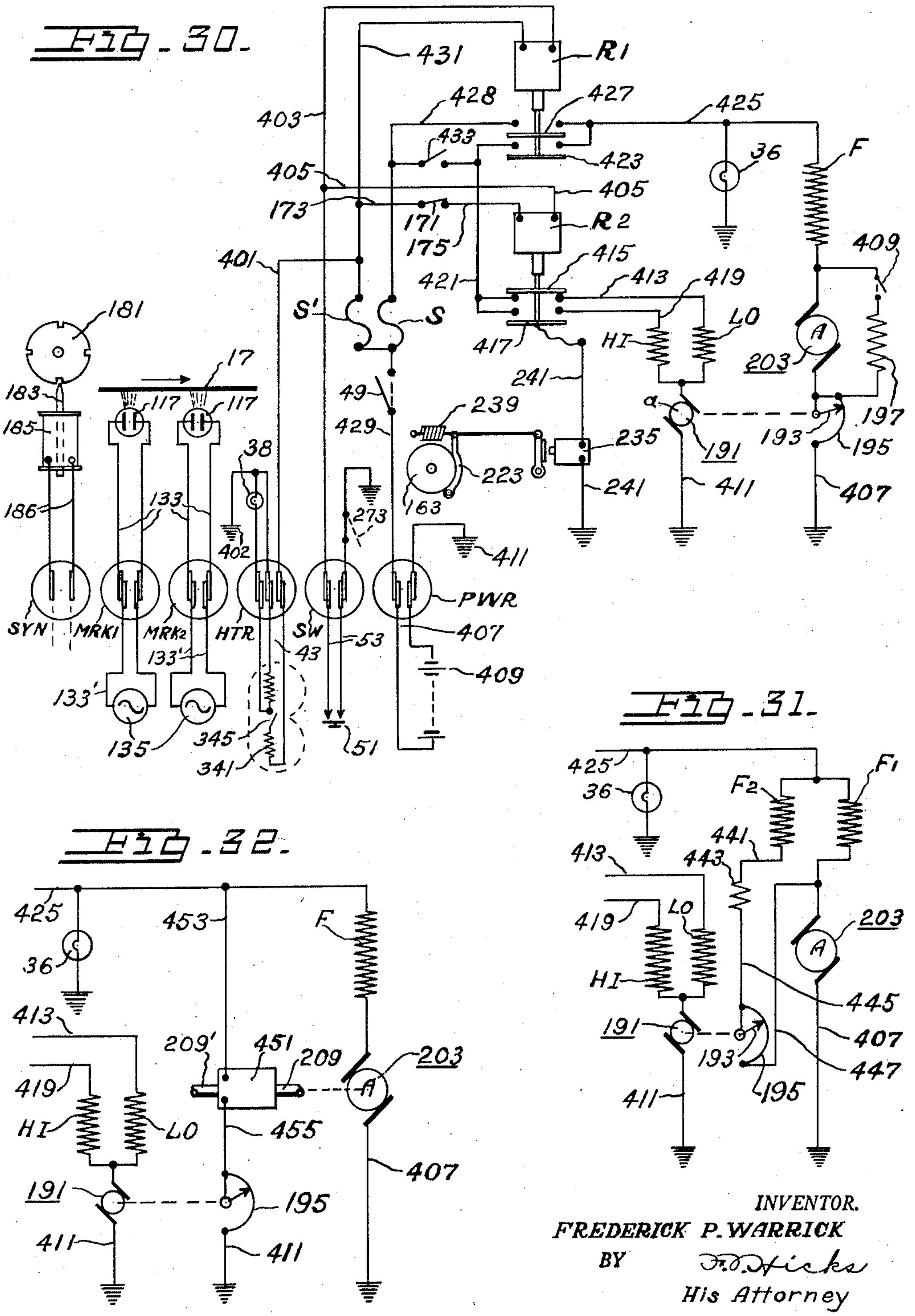

Fig. 3 is an enlarged right-hand side elevational view of the recording apparatus with the adjacent sidewall and cover being broken away to directly show internal structure, while other internal elements are shown by dotted lines, the path of a recording strip being represented by dotted lines with arrows showing the direction of movement, and the reel magazine being removed from the top of the apparatus;

Fig. 4 is a sectional view taken on line 4—4 on Fig. 3 with a fragmentary portion of the coupling end of power transmission means from a recording strip power transmission means being shown in dotted lines as disposed for coupling to the recording apparatus for driving therefrom;

Fig. 5 is an enlarged fragmentary sectional view on line 5—5 on Fig. 3 for showing the swivelled reel driving means in the recording apparatus, the end of a reel driving spindle being shown in dotted lines;

Fig. 6 is a left-hand side elevational view of the recording apparatus, with the large cover removed and the brake mechanism on the supply reel spindle of the apparatus being partially represented in dotted lines and the edge of the brake drum being broken away;

Fig. 7 is a side elevational view showing the aperture plate for guiding a recording strip and regulating the light thereon as it moves in the apparatus, being similarly shown in Fig. 3, but substantially enlarged in Fig. 7, the cooperative recording strip and recorder apparatus structure being shown in dotted lines;

Fig. 8 is a front elevational view of the aperture plate of Fig. 7;

Fig. 9 shows a cross-sectional view taken on line 9—9 on Fig. 7, the adjacent mounting structure of the apparatus being shown in dotted lines;

Fig. 10 is a view similar to Fig. 9 but showing a different embodiment of the aperture plate, which fits upon the recording apparatus in a similar manner, but which adapts the apparatus to magnetic recording;

Fig. 11 is a front elevational view showing a different embodiment of light regulating aperture plate wherein the size of the aperture may be adjusted as desired to suit various operating conditions;

Fig. 12 is a side elevational view thereof;

Fig. 13 is a rear elevational view of the aperture plate shown in Fig. 11, and partially broken away and dotted to show the internal structure thereof, and the curtains being also shown in a dotted position;

Fig. 14 is a sectional view along line 14—14 on Fig. 12;

Fig. 15 is an enlarged elevational view showing only the two light obstructing curtains in cooperative relation with the reversely threaded adjusting shaft;

Fig. 16 is an enlarged side elevational view showing one of the end mounts which supports opposite ends of the adjusting shaft;

Fig. 17 is an enlarged elevational view for more clearly showing the impulsive wheel and coil which is partially shown in Fig. 6;

Fig. 18 is an enlarged plan view showing the lamp socket block for the marking lamps, adjacent structure being shown dotted to clearly illustrate how the lamps are accurately secured in a proper cooperative position, and how the lamps are at the same time clamped to resist movement by vibration;

Fig. 19 is an enlarged side elevational view showing the reel magazine unit, being partially broken away and sectioned to show the internal structure, and with dotted lines and arrows diagrammatically representing a recording strip moving out from one chamber and back into the other chamber;

Fig. 20 is a bottom view of the reel magazine, the end portions being broken away;

Fig. 21 is a fragmentary enlarged view more clearly showing the lower end of the attachment rod of the magazine in cooperative relation with the two light traps which are thereby controlled simultaneously, as represented by dotted lines;

Fig. 22 is a fragmentary sectional view along line 22—22 on Fig. 19;

Fig. 23 is an elevational view showing the terminal or plug-in socket plate which is mounted on the back of the instrument and bears suitable indicia for convenience in making the electrical connections;

Fig. 24 is an enlarged fragmentary view showing the lower corner of the large cover toward the front of the recorder, and showing the yardage indicating and control instrument mounted therein;

Fig. 25 is an inside view of this corner of the large cover, and showing the yardage and control instrument mounted therein;

Fig. 26 is a portion of the Fig. 25 view but with the operating switches omitted so that the control lever may be more clearly shown in a full line position and also in a dotted line position;

Fig. 27 is a plan view looking down on the apparatus shown in Fig. 25, the lower switch being shown;

Fig. 28 is a diagrammatic view representing a recording tape moving in the recorder and showing how a transient phenomenon may be recorded thereon either by a varying magnetic field, or by varying light, accordingly as either type of recording strip is utilized;

Fig. 29 is a diagrammatic view representing a recording strip moving through the apparatus and having evaluating or timing marks impressed thereon either by light or magnetic field sources;

Fig. 30 is a diagrammatic view representing the six plug-in sockets with all the connections therethrough, and including the complete control circuits of the recording apparatus;

Fig. 31 diagrammatically represents only the portion of the control circuit pertaining to the speed control of the main motor by the servo-motor and showing a different arrangement of this part of the control circuit; and Fig. 32 diagrammatically shows a still different arrangement of the speed control part of the control circuit.

Referring more specifically to Fig. 1 of the drawings, there is illustratively disclosed an embodiment of the high-speed strip recording apparatus comprising a two reel magazine unit 11 which, by means of an attachment rod 13 turned by a knob 15, is conveniently mounted and secured on top of the recorder body 16. The reel magazine unit supplies a suitably prepared recording strip 17, to pass from the supply reel 19 in the magazine down through the recorder to receive recording impressions and then returning upwardly around a drawing reel 21 in the magazine, as represented in dotted lines with arrows showing the direction of travel of the recording strip therethrough. On the front of the recorder a suitable window or lens 23 is provided for admitting a recording ray or light beam when it is desired to use a light sensitized recording strip, such as comonly utilized in motion picture cameras, for example. And for light recording a removable cover cap 25 facilitates focusing the lens.

The operations of mounting, removing and replacing the reel magazine unit, and of focusing the lens, will be subsequently described in detail. Also, as may be seen in Fig. 2, the recorder body 16 is provided with an upstanding portion 27 provided with connectors 29 to plug into the reel supports in the magazine 11 for operative connection therewith while also providing further protection for the magazine as it is mounted on top of the recorder.

As Figs. 1 and 2 show, a small cover 31, mounted upon the right-hand side of the recorder body, is secured thereon by turning a knurled knob 33, which controls attachment means to be described in detail later, and the removable focusing cap 25 is mounted upon an aperture in an annular flange 26 on this removable cover. The remainder of the right-hand side of the recorder, as may be seen in Fig. 1, is closed by a body sidewall 34 integral with the body. This wall carries two fuses S and two different colored pilot lights 36 and 38.

As Fig. 2 shows, a large cover 35 is mounted on the left-hand side, being the entirely open side, of the recorder body. This large cover is provided with and carries a yardage indicating and control instrument 36, of which only two control shafts and knobs 37 and 39 can be seen projecting to the left-hand side of the apparatus, a third being concealed in alignment therewith. This yardage instrument is shown in detail in Figs. 24 through 27.

The reel magazine 11 is provided with a plug-in socket 41 on the rear wall and, as represented in Fig. 1, a three conductor cord 43 may be therein connected by a plug 45 to a socket on a socket plate 47 mounted on the rear of the recorder body for heating the reel chambers, in a manner to be later described in detail. Fig. 1 also shows the main switch 49 mounted upon the rear wall of the recorder body, by which the entire apparatus is turned on ready for operation. A convenient hand held push button 51 is provided on the end of a cord 53 which is plugged into another socket on the terminal board 47 for convenience of an operator in controlling the starting of the apparatus accurately with some test or experiment being conducted.

Additional body structural details are shown in Figs. 3, 4 and 6, and it will be seen that the body comprises a top wall 55, a rear wall 57, a bottom wall 59 and a front wall 61. These top, rear, bottom and front walls are peripheral or outer walls disposed in a contiguous enclosing relation surrounding and protecting the enclosed space wherein the various apparatus and delicate instruments of the recorder are housed. The enclosed space is substantially rectangular in cross-sections and it is divided by a dividing wall or partition 63 strongly attached to the peripheral walls around its edges to lend rigidity to the entire structure, and also providing a firm support for the apparatus and elements which are mounted upon both sides of and through this partition. For most effectively serving such purposes this body structure is preferably cast integrally from a suitable lightweight metal such as aluminum or magnesium, or any suitable alloys of these or other metals. So formed the body and base support structure is rigid, strong and free from vibrations, as well as also providing an enclosure which is substantial enough to afford desirable shielding from various radiations which could be deleterious to the recording strips.

The upper or top wall 55 of the body is provided with a mounting area 65 and recess for receiving the reel magazine 11 cooperative with an outer guide flange 67 on the small cover and an inner guide flange 69 on the body for accurately receiving and positioning the bottom of the reel magazine. This area is provided with an internally threaded hole 71 for receiving the lower threaded end of the attachment rod 13 to be turned down therein by the knob for attaching the magazine firmly down upon the body. The partition 63 of this body continues up above the top wall 55 providing an elevated wall 73 standing up adjacent one side of the reel magazine and coupling operatively therewith, in a manner to be subsequently described in detail.

The top wall 55 of the body terminates at the inner guide flange 69, at the elevated wall 73. In the upstanding part 27 the elevated wall 73 has a peripheral flange 75 extending in a right angular relation from this wall and having its edges in a continuing aligned relation from the adjacent edges of the peripheral walls of the body for receiving the edges of the large cover 35, in snug fitting relation thereon. The large cover 35 is drawn and secured tightly to the recorder body by any suitable fastening means, such as by counter-sunk screws 77, seen in Fig. 4, which threadably enter suitable holes 77' provided at spaced positions in the partition 63 and in the elevated wall 73, as may be seen in Fig. 6. To further assure a snug fitting relation between the large cover 35 and the body, the cooperative edges may be provided with an internal interfitting flange similarly to the smaller cover, if desired. In casting the recorder body integral with the upstanding part 27, a reinforcing rib 81 is also preferably provided extending from the bottom of the body to the top of this upstanding part 27, in order to impart additional strength and rigidity to this structure to resist the considerable stress and strain due to quick starts and high speed operation.

The small cover 31, as seen in Fig. 1, is secured upon the right-hand side of the body 16 by turning a knob 33 from which a locking pin extends into an apertured socket 35. This socket can be seen in Fig. 3, and it is also shown dotted in sectional view Fig. 4 where may be seen the transversely disposed locking pins which fit into the socket for firm securement by merely turning the knob 33 in a proper direction. The engaging edges may be provided with snug interfitting steps or flanges, as shown. Turning knob 33 permits removal of the small cover 31.

In Fig. 3, the small cover 31 is shown broken away to show the internal structure in this side of the body, where the path of travel of a recording strip is shown by dotted lines with arrows representing the direction of travel. As will be seen in this view, the recording strip moves down from the opening or intake port 83 in the mounting area of the top wall of the body and it continues on down through a narrow gate or gap 85. This gap is just barely wide enough to be in incipient contact with the strip so that it does not hold the strip but is just close enough thereto to prevent fluttering of the strip as it moves along. This gap is formed by an aperture plate or gate plate 87 provided having a smooth plane surface adjacent the gap and secured snugly and accurately in a proper position in the recorder by means of a mounting base or pedestal flange 89 through which a screw, or a locking pin 91, passes into the rigid intermediate partition of the body. This base has a pair of pilot pins 93 entering suitable pilot apertures in the partition to assure that the smooth plane guide surface of this gate plate is accurately positioned and spaced as it is secured into the recorder. Such gate or aperture plates 87 are conveniently replaceable and are provided in various forms, to be subsequently described in detail.

As also may be seen in Figs. 3 and 4, the other or rear side of this strip guide gap is formed by the front wall of a focusing cavity housing 95 having a suitable smooth plane surface. For rigidity and additional security this housing is cast integral with the partition in the body of the recorder. As may be seen in Fig. 4, this housing extends toward the right hand side of the body and terminates with the cavity opening just inside of the focusing cap 25 in the small cover. This cavity encloses a focusing mirror 97 disposed at an angle suitable for observing the back of the photographic film. And when doing light recording, merely by removing the cap 25, a portion of the light sensitive film is utilized as a focusing screen for suitably focusing the lens or for positioning the exhibit or test suitably relative to the recorder. From this mirror cavity an aperture 99 opens toward the front of the recorder in alignment with the aperture 101 in the aperture plate, both said apertures being represented dotted in Fig. 3, and an aperture plate being more clearly shown in Figs. 7, 8 and 9. This focusing operation is done substantially as disclosed in my co-pending Patent application Serial No. 738,855 filed April 2, 1947, and issued as Patent Number 2,629,646, February 24, 1953.

The film, or recording strip, continues down from the gap and passes under the freely rotating cylindrical end of a speed controller 103 which it drives at a speed corresponding to the velocity of movement of the recording strip. This speed controller may be any suitable speed responsive governor device which will open and close electrical contacts as the speed of movement of the strip is greater or less than some desired speed to be automatically maintained by the apparatus. The device specifically represented herein is my same speed controller which is fully disclosed in my co-pending Patent application Serial No. 259,057 filed in the United States Patent Office on November 30, 1951, now issued as Patent 2,643,871. Although the external cylindrical surface of this speed controller is shown as provided with teeth 105 for meshing with the sequence of apertures commonly provided along both edges of photographic cinema film, it has been found that these teeth may be omitted as the tension of the strip passing around this rotary member provides sufficient tractive effort to drive the speed controller. My co-pending speed controller is especially satisfactory for this purpose, because its form facilitates mounting its bearing 107 in the partition of the recorder body with the driven end of the device conveniently exposed for driving from the recording strip, the end finger tab 108 being exposed, and the other end being exposed on the other side of the partition for convenience in connecting the control contacts by conductors extended into the electrical speed control connections, to be later shown and described in detail.

The recording strip having passed under the speed controller, as shown in Fig. 3, continues its path of travel upwardly on the other side where it passes partly around an idler wheel 109 mounted upon the end of a shaft 111 which is rotatively journalled in and extends through the partition of the body to drive the yardage indicator and controller instrument on the opposite side, and to be subsequently described in detail. The idler wheel 109 is preferably provided with teeth to mesh with holes in the margins of the record strips to assure that it is driven accurately in accordance with the movement of the strip.

An additional idler 113 is rotatively mounted upon a shaft 114 projecting from the partition and positioned so that it guides the recording strip to pass upwardly through an outlet port 115 in the top wall of the body to return to the drawing reel in the reel magazine on top of the recorder body. In Fig. 1, a supply reel 19 and a drawing reel 21 are represented in dotted lines. As will be seen in Fig. 3, it is a simple operation, when installing the reel magazine unit, to draw a loop of the recording strip down and around this circuit in the recorder body. The small cover 31 is then replaced and secured upon the recorder body by turning the locking knob 33, as previously described.

As Figs. 3, 4 and 6 show, for utilizing light sensitive recording strips or films, I provide one or two flashing gaseous lamps 117 which impress a series or succession of evaluating or timing marks upon the film as it passes through the recorder. These electrical bulbs 117 are mounted in a cavity 119 opening through the partition and are held in a split socket bar 121 made of any suitable insulation and fitting snugly into the cavity. As detail view Fig. 18 shows, this socket bar 121 is provided with a slot 123 extending between the two lamp sockets 125, which may be split on adjacent sides, and one side of this slotted bar is provided with an indentation 127 to receive the point of a holding screw 129 which accurately locates this socket bar at a proper position in the cavity in the body. The purpose of the slot 123 is to provide suitable yielding resilience so that the pressure of the holding screw also serves to lock the lamps snugly and the vibrations caused by high speed operation will not cause the lamps to be loosened. Light from these lamps is admitted to the back of the film through holes 131 opening frontwardly through the rear wall of the gap, and shown dotted in Figs. 3 and 18. Alignment of the lamps 117 with these holes 131 is assured by the indentation in one side of the socket bar receiving the point of the holding screw 129, also this proper position is permanently maintained by the socket bar and by the lamps both being held firmly by the pressure of the screw. Individual pairs of conductors 133, seen in Fig. 30, extend from each of the two lamp sockets to individual sockets MKR1 and MKR2 on the terminal plate 47 on the back of the recorder, so that external sources of different suitable frequency of alternating electrical current can be conveniently plugged therein. This serves to flash the lamps at the desired timing frequencies to apply corresponding timing marks or dots on a photo film moving through the recorder. After the small cover 31 has been installed, the recorder may be set for the desired speed control by setting the externally exposed finger tab 108 which projects through an aperture 137 in the cover.

In Fig. 3, the reel magazine unit being omitted, may also be clearly seen the two reel coupling plug-in apertures 139 in the upper portion of the elevated wall structure. Exposed in each such plug-in aperture 139 is the coupling head 141 of a reel drive or control shaft 143 which, as shown more clearly in Fig. 5, receives thereon the suitably shaped coupler or connector 29 as represented in dotted lines, and which extends from a reel supporting shaft 144 of an installed reel magazine, to be subsequently described in detail. The coupling members 29 and 141 are of a suitably cooperative non-circular shape. This reel control shaft 143 extends through to the other side of the elevated wall 73 into the recorder passing loosely through a swivel bushing 145 to a point where the shaft is provided with a ball-like enlargement 147 through which a pin 149 is diametrically passed having its opposite ends projecting loosely into apertures 151 in this bushing. This permits a loose swivelling movement of the coupling end of this shaft to facilitate the coupling of a reel shaft coupler 29 as a reel magazine is being installed.

Fig. 5 further shows that the swivel bushing 145 has one end snugly mounted in the inner race 153 of a ball bearing, the outer race 155 of which is mounted in a collar secured to the elevated wall of the recorder to support this shaft therein. As shown, this swivel bushing 145 is also provided with a driving gear 157, secured firmly thereon, for driving this shaft 143 in a manner to be later described in detail. The particular reel control shaft 143 shown in Fig. 5 is adapted to be coupled with the drawing reel 21 in the magazine and it is extended sufficiently to the left-hand side, as seen in Fig. 5, to pass out through an aperture 159 in the large cover 35 and its externally exposed end is provided with a knurled knob 161. By manually turning this knob 161 the drawing reel 21 may be turned a small amount to facilitate making the set-up when starting a fresh recording strip. As shown in the upper part of Fig. 4 this knurled knob projects through the large cover to be exposed for convenient adjustment and in alignment therewith a reel supporting and driving shaft 143 is shown in dotted lines. The other reel control shaft 142 of the recorder having its coupler head 141 exposed as shown at the left-hand side of the upper portion of Fig. 3, is adapted to be coupled with the shaft of the supply reel 19 in the magazine, and in the recorder it is provided with a brake drum 163, which may be seen represented in dotted lines in this view.

The opposite side of the recorder, is shown in Fig. 6 with the large cover removed. Here may be seen the opposite end of the lamp cavity 119 with one of the flashing gaseous lamps 117 in the partition. Also the opposite end of the idler supporting shaft 114 is seen having a nut 165 threadably thereon to hold it in the inner race 167 of a ball bearing, the outer race 169 of which is mounted in a suitable aperture in the partition. In the lower right-hand corner, as shown in Fig. 6, the end of the speed controller 103 is seen with its contact 171 movable thereby to engage a stationary contact in accordance with the velocity of the recording strip, as disclosed in detail in my co-pending aforementioned patent application. Conductors 173 and 175 extend therefrom to the control circuit, to be described.

From this same side of the recorder, as shown in Fig. 6, may also be seen the opposite end of the shaft 111 which supports the yardage measuring idler, and which at this end carries a small gear 177 to drive a yardage instrument wheel 179, shown dotted. This shaft 111 is mounted in a bearing in the partition, and it extends further to support and drive a notched impulsing wheel 181 adjacent the tapered end of a core 183 of magnetizable metal upon which a pick-up coil or winding 185 is disposed, being supported by a bracket 187 from the partition. As Fig. 17 more clearly shows, the notches in the wheel 181 pass very close across the tapered end of this core 183 which, being energized by connection of the coil through two conductors 186 to any suitable direct current electrical source, causes impulses to be induced in the coil and to also traverse these conductors. For convenience these conductors connect from this coil to one of the sockets "SYN" on the terminal plate on the back of the recorder so that by a convenient plug the D.C. energization may be applied. By suitable inductances and condensers, these impulses can be excluded from the direct current source, and can be applied to an amplifier or other apparatus, as will be readily understood. Also a small gear 177 meshes with the wheel 179 of the yardage meter, shown dotted, as the cover 35 is installed.

A servo-motor 191 is provided mounted on this side of the partition, and it is utilized for speed control in combination with the speed senser previously mentioned. This is a commutator type of direct current motor having speed reducing gearing, and having one end of the shaft extended to carry a contact arm 193 back and forth over a resistor 195 to provide a variable resistance utilized in speed controlling relation in the system, to be described in detail later. Ample space is also available to mount a resistor 197 between a pair of spring clips 199 on one flange at this side of the partition, and also to mount directly upon the partition a pair of relays R1 and R2. Although a particular make of relay is represented, any conventional relays may be utilized having the necessary front and back contacts to cooperate in the circuits in the manner represented in Fig. 30, to be later described in detail.

Also seen at this left-hand side of the recorder is the opposite or driven end of the drawing reel drive shaft 143, the swivel mounting of which was previously described, and also the gear 157 secured thereon. Mounted therebelow in a large aperture 201 in the partition is a driving motor 203 supported by a heavy bracket 205 which is bolted to the partition with the motor extending partly through the partition. The driving motor 203 has speed reducing gearing 207 and a shaft 209 extending upwardly therefrom has its upper end journalled in a bearing bracket 211 mounted on the upper part of the elevated wall adjacent the reel driving shaft, and presenting an attached gear 213 meshing with the gear 157 secured upon the reel driving shaft 143. These intermeshed gears 157 and 213 are preferably forty-five degree spiral gears and both are rights.

Electrically the main driving motor 203 is preferably a universal A.C. and D.C. series motor which is operated in combination with various controls to be subsequently described in tracing the operation through the wiring diagram shown in Fig. 30.

As Fig. 6 further shows, this end of the supply reel control shaft 142 is provided with the brake drum 163 secured thereto, as by a pin, and having its cylindrical brake drum surface extending toward the partition through which this shaft is journalled. While a recording strip is being drawn from the supply reel, which is coupled with the other end of this shaft, the brake drum 163 is caused to rotate in the counter-clockwise direction, shown by the arcuate arrow, a small spring 215 drawing a brake shoe 217 to provide a light but continuous drag on the brake drum. For this purpose the small brake shoe 217 is of an arcuate form for fitting the inner surface of the drum and it is pivotally mounted at one end on a pivot pin 219 projecting out from the partition. The free end of the small brake shoe is drawn by this small spring 215 which is attached to an anchor pin 221 projecting from the partition. A large brake shoe 223 is also provided of an arcuate form suitable to fit against the inside surface of the brake drum and which has one end pivotally mounted upon a pin 225 projecting from the partition. From the free end of this large brake shoe a link 227 pivotally connects to the free end of an armature lever 229 the other end of which is pivotally mounted upon a pin 231 projecting from the partition. An armature 233 is mounted intermediately upon the armature lever, as by having lugs projecting therethrough and secured by an anchor wire, with a piece of rubber, or like material, may be inserted to eliminate chattering and vibration noises. The armature 233 is thus supported adjacent poles of any suitable electromagnet, which is herein represented as being a conventional E-type of field structure having a winding 235 upon the middle leg of the field, as shown in dotted lines. This electromagnet is secured by a clamp 237 drawn toward the partition by screws, which extend threadably thereinto. A tension spring 239 is provided having one end secured to the armature lever 229 adjacent the free swinging end of this lever and the other end of this spring being drawn up to an anchor pin projecting from the partition. This spring 239 tends to draw the large brake shoe 223 up against the inner surface of the brake drum for applying a strong braking force to the shaft and to the supply reel connected therewith. Wires 241 extend from the brake electromagnet winding 235 and are connected into the control circuits for energizing this winding which causes the armature to be drawn thereto for drawing the large brake shoe 223 away from the brake drum and releasing the brake at the proper time in the operation of the apparatus.

Energizing and control wires from the above described brake controlled electromagnet winding and from the motors, relays, and all the other electrical elements of the recorder, are extended and lead through the ample spaces which are still available in the recorder body to respective ones of the sockets of the terminal plate on the backwall of the recorder. For clearness such wires have been omitted from these views and will be readily understood by those skilled in the electrical arts, as all these connections are shown and described in conjunction with the main wiring diagram shown in Fig. 30 of the drawings.

The terminal plate 47 and its sockets 243 are shown in Fig. 23. On the plate suitable indicia clearly designates the purpose of each socket to facilitate plugging in the proper connections. One socket is designated "PWR" to indicate that the main power supply plug should be plugged thereinto. A socket designated "SYN" is internally connected with the impulsing wheel in the recorder and is to receive a plug connection from an external amplifier or other apparatus to receive the impulses, generated as previously described. The two sockets designated "MKR1" and "MKR2" are internally connected with the two marking means adjacent the moving strip for applying evaluating or timing marks thereon as the recording strip moves along. Such marking means may be the two flashing gaseous lamps shown in Figs. 3, 4 and 6 or may be the magnetic recording heads shown in Fig. 10, accordingly as the recording strip is light sensitive film or magnetic recording tape. The socket marked by the indicia "HTR" is for the heating cable 43 which connects up into the heater elements magazine reel chambers, to be described. This socket terminal plate 47 is provided with corner located holes through which screws may be passed to secure it firmly upon the backwall of the recorder body, the latter being suitably apertured to pass the electrical connecting conductors therethrough between the socket terminals and the elements in the recorder.

Figs. 24 through 27 show the yardage meter and control instrument 36 which is mounted in the lower right-hand corner of the large cover 35. This instrument is adapted by taking an electric range timer instrument in common use on a well known electric range, and available on the open market. As viewed from the front in Fig. 24, the only changes made consist in providing differently calibrated scales 245 to indicate units of length of the recording strip instead of time. Any suitable calibrations may be utilized, although as shown each division on the outer scale represents one foot, and each number is ten feet. On the inner scale the numbers represent one hundred feet each. The meter 36 and its clockwork movement is mounted just inside of the cover so that the dials may be seen through an aperture 247 in this cover, the instrument being secured in the cover by screws 249 seen in Fig. 24. The large cover 35 is also apertured to extend therethrough the usual setting shaft 251 and also the usual switch resetting shaft 253, these being provided with the convenient manual knobs 39 and 37 respectively. Also the usual central shaft 255 projects axially from the center of the dial 257 with the knob conveniently exposed.

Fig. 25 shows the instrument from the back, the works comprising the usual clockwork except that on the back plate 262 gear wheels 263 and 179 have been added for driving the instrument and the usual synchronous electric driving motor has been omitted. One of these gear wheels 263 is secured upon the same shaft 267 of the clockwork which, when in use as a range timer, is normally driven by an electric clock motor. The other added gear wheel 179 is rotatively supported upon a stud shaft 269 added upon the back plate and it also comprises a small gear wheel 271 meshing with the other added gear wheel 263.

When the large cover 35 is installed upon the recorder body, the added gear 179 comes into mesh with the small gear 177 from the yardage idler wheel 109 on the recorder for driving the yardage instrument, in accordance with the length of recording strip passing through the recorder. The gear ratios of the two added gears 263 and 179 are selected to be in suitable relation to the calibrated scales of the instrument and also in relation to the diameter of the previously described yardage idler wheel 109 of the recorder, for rotating the inner dial and the pointers of the instrument so as to provide accurate indications of the length of recording strip which has been run.

The lower switch 273, shown mounted on the back of this instrument, is operated in the same manner as the usual switch in the range timer by a switch lever 275, although the larger switch shown is provided for greater current capacity. This switch lever 275 is set to be held up on a semi-circular cam 277 in the usual manner, and the cam, after a predetermined rotation determined by by the setting desired, lets the swinging end of this switch lever fall back upon a second semi-circular cam 279. A spring 281 draws this switch lever to rotate against these cams, and after the second cam has completed a predetermined selected rotation it releases the swinging end of this switch lever 275 which then falls down and engages a stop pin 283 at the same time rotating a pin 285, projecting from the lever shaft 253, to depress the switch push button 287 to open the contacts inside of this switch, in a usual manner. The spring 281 which rotates the switch lever 275 and its shaft 253, is an added spring having greater strength than the coiled spring usually found on this instrument. The usual switch lever 275 is of sheet metal, being a rather flexible arm, having the upper end curled outward away from the instrument. This causes it to move smoothly up over the end of the cams 277 and 279 while being raised and reset by depressing and turning the knob 37 on the front exposed end of this shaft 253, the depressed position of the switch arm, as it passes over these cams, being shown in dotted lines in Fig. 27. The switch 273 is connected into the control circuits to stop the main driving motor 203 when the desired length of recording strip has been run, in a manner to be described in conjunction with the main wiring diagram to be discussed in detail subsequently.

The small switch 289, shown mounted above the switch lever 275 in Fig. 25, has a depending actuator 291 disposed to be engaged by the shaft end of the switch lever 275 as it is turned up to its highest position represented in dotted lines. When the upper cam 277 releases this switch lever 275 to fall back on the second cam 279 the small switch 289 is actuated. This operation, which in the electric range started a cooking operation, is here utilized to start some transient phenomenon which is to be observed. In this manner the recorder has time to run up to high speed before the transient manifestations are impressed upon the recording strip.

Figs. 19 through 22 show the features and structural details of the recording strip magazine 11 which is a unit that can be easily and quickly installed or removed and replaced to load the recorder apparatus with recorder strip or to remove an impressed recording strip and replace it with a fresh strip to make further records of transient phenomena. This reel magazine comprises a unitary housing 303 of a conformation forming or enclosing two reel chambers 305 in an adjacent spaced relation and presenting a conveniently exposed mounting area 307 on the bottom for fitting upon the mounting area 65 on top between the flanges 67 and 69 of the body of the recorder. As shown, the two chambers 305 so formed are of a substantially flat cylindrical shape with one end of each chamber closed and the opposite end open. The open edges of the outer walls 308 of the two reel chambers 305 are internally threaded for receiving individual covers 309 which are provided with corresponding peripheral threads. Portions of these covers may be seen in Fig. 19. In Fig. 22 is shown the cooperative relation of the edge of one of these covers 309 in the open end walls 308 of one of the chambers 305, and it will also be seen that the peripheral edge of the cover is preferably provided with an outwardly extending flange 311 which overlaps the threaded joint as the cover is turned snugly into the end of the chamber. This provides for greater protection and shielding of the recording strip to be housed therein. The reel chamber covers are provided with liners 313 of nonmetallic sheet material, such as commonly available phenolic impregnated fibrous sheets. The inner surfaces of these covers are slightly recessed and these sheets are inserted and cemented thereinto. Protection is thus provided between the metal covers and the moving recording strip material. Also to provide further protection and shielding in a structure which is strong, rigid and light of weight, the magazine body, as well as the covers, are preferably cast of a suitable light weight metal or alloys thereof.

As Fig. 19 shows, the attachment rod 13 passes down through the center of this magazine unit with the upper end conveniently exposed above the unit and presenting a manual knob 15 by which it can be turned to screw the lower end portion thereof down through an aperture in the center of the base cross-piece 315 in the mounting area on the bottom of the magazine unit, and is screwed into the cooperative threaded hole 71 in the center of the mounting area 65 on top of the recorder body. Secured upon the upper portion of this attachment rod 13 is a clamping sleeve 317 which, by clamping down upon the magazine between the two chambers, secures the magazine unit snugly upon the recorder body. The magazine unit has a locating down step 319 which fits into a corresponding recess in the mounting area on top of the recorder body, and this also in cooperation with the lateral flanges on both sides of the mounting on the recorder body and also the passing of the attachment rod 13 down into the threaded hole 71 in the recorder body all assure that the magazine unit is secured with its outlet and intake ports accurately aligned with the intake and outlet ports of the recorder body for free passage of the recording strip therethrough.

Simultaneously controlled by the attachment rod 13 are two light traps, one being in the outlet port 321 and the other in the intake port 321 of the reel magazine unit. As Fig. 21 more clearly shows, each of these light traps comprises a lever 323 pivotally mounted upon a pivot pin 325 which extends from the back-wall of the magazine unit. Each lever 323 is so positioned that its lower end moves across the adjacent port opening and the upper end of each trap lever extends upwardly and adjacent to the attachment rod 13. Secured upon the attachment rod is a cam 327 which may be of a substantially cylindrical shape with the lower end tapering downwardly to enter between the adjacent ends of the trap levers. To facilitate entry of this cam 327 between the two levers 323, the upper ends of these levers are preferably bent to incline upwardly and away from the attachment rod. As the rod 13 is moved downwardly to attach the magazine unit upon the recorder body, the cam 327 will enter between the upper ends of the two levers 323 causing the lower ends to move across the ports and toward the rod to open the two light traps for operation. To more effectively exclude the entry of light through the two port openings, each port is provided with a strip 329 of opaque flexible material, the ends of these strips being secured to the base cross-piece 315 between the two ports, as by a bottom plate 331 secured on the unit by screws and apertured in alignment with the two ports of the unit. These two opaque strips 329 pass to the lower ends of the two levers and are secured, as by cement, to the outer surfaces thereof remote from the rod with sufficient slack so that the levers can swing freely to the trap closed positions, as shown in full lines in Fig. 19, so that these strips extend across these ports and thereby exclude the entry of light. A tension spring 333, of which there may be two, is provided drawing the upper ends of the two light trap levers together so that the lower ends are moved apart to trap closing positions as soon as the attachment rod 13 is moved upwardly as in removing the reel magazine from the recorder body. Fig. 21 shows the light traps in closed positions in dotted lines and in full lines shows the traps opened by the downward movement of the attachment rod which pushes the cam down between the upper ends of the two trap levers. The opaque strips 329 may be made of black fabric, rubber, plastic, or other material and are wide enough to extend across to the full width of the ports, 321 and 321', which may be as seen in Fig. 20. These two strips may also be continued up to be more firmly secured by cementing to the stationary cross-bearing 335 through which the attachment rod 13 slidably passes as it is operated upwardly or downwardly. If desired, the two strips 329 may be extended around and secured on the inner surface of the outer wall 308 of each reel chamber.

As seen in Fig. 19, the supply reel support shaft 144 of the reel magazine is centrally positioned in the supply reel chamber which is the chamber on the left-hand side, and the drawing reel support shaft 144 is centrally disposed in the chamber on the right-hand side. These reel support shafts 144 are rotatively supported in the center of the closed end walls of the two chambers and extend through to present the couplings 29 for coupling upon the exposed ends of the corresponding shafts from the recorder, for driving and brake control, as previously described. Each of the two reel support shafts 144 is adapted for receiving and supporting recording strip loaded reels secured thereon in a relatively non-rotative manner, as by having a spool secured thereon or being square or non-circular in cross-section to fit into the reels in the manner common in cinema projectors for example. The coupling relation of one of these shafts with a corresponding shaft of the recorder is illustrated in Figs. 4 and 5, where the reel shaft and coupler end are shown dotted. Both of these recorder journaled shafts 142 and 143 embody the previously described swivelling arrangement to facilitate coupling the reel support shafts thereto when installing a reel magazine unit upon the recorder.

To heat the reel chambers and maintain optimum operating temperatures under adverse climatic conditions, two electrical heater elements 341 are provided, as may be seen in Figs. 19 and 22. These heating elements 341 are arranged in spread or spaced relation one in each reel chamber, which may be accomplished by bending the heater elements into a generally spiral formation and mounting upon the closed end wall of each chamber in a sandwich like relation between two pieces of sheet insulation material 343, such for example as some of the well known phenolic impregnated fibrous sheet metal. The two outer ends of these heater elements 341 are brought together adjacent the intermediate space, as seen in Fig. 19, and are there connected to the ends of a thermostatic switch 345. This thermostatic switch is adjusted to close when the temperature drops below the heat desirable for the recording strip being used. This energizes the heating elements 341. As usual the thermostatic switch opens when the temperature of the space has been raised to a predetermined desired temperature. The other two ends of the two heater elements are connected into the terminal socket 41 provided upon the magazine unit, as previously mentioned and shown in Fig. 1, and from which connection can be conveniently made by the short plug-in cord 43 to supply heating current from the socket marked "HTR" on the back of the recorder body.

Viewed in Fig. 19, a supply reel 19 of recording strip 17 is represented by the dotted line circle as mounted upon the reel support shaft in the left-hand chamber of the reel magazine, the strip being drawn as indicated by the dotted lines and arrows, to pass down and out from this chamber through the outlet port 321. After passing around its path of travel in the body of the recorder, the recorder strip enters the intake port 321' and is drawn to wind upon a drawing reel 349 on the reel supporting and driving shaft 144 in the right-hand chamber. Idler pulleys or wheels 351 are provided on pivot shafts, one adjacent to each of the two ports in the magazine unit so that the recording strip 17 flows freely and in a straight line through these ports without rubbing against the sides.

When the left-hand chamber of Fig. 19 has been loaded in the dark room with a light sensitive film, the two light traps are automatically opened, then a portion of this strip is conveniently threaded down out of the outlet port 321 to provide a loop of ample slack and it is then threaded up through the inlet port 321' and secured upon a drawing reel 21 in the right-hand chamber. The covers 309 being snugly installed and the attachment rod 13 being moved axially sufficiently to close the two light traps, the reel magazine unit may be taken out of the dark room and carried about without special protection. A number of such reel magazine units may be charged in this manner at the same time. The operator is then prepared to run a large number of tests and make recordings thereof by conveniently installing and interchanging these reel magazine units upon the recorder body, in the manner previously described. Not only are the recording strips well protected mechanically but this material is also shielded from adverse radiations or light as well as being protected from the adverse effects of cold and dampness during operation.

As previously described with reference to Fig. 3, a gap or gate 85 is accurately formed at the front of the focusing chamber for guiding the passage of the recording strip through the recorder by means of a plate 87 mounted in a spaced relation thereto.

Figs. 7, 8 and 9 show more of the structural details of this gate plate, as embodied in an aperture plate 87 which also serves to provide a light controlling aperture 101 which is useful when light sensitive film is the recording medium. As mentioned, this member has a pedestal flange or mounting base 89 provided with pilot pins 93 suitably spaced to fit into corresponding holes in the partition in the body of the recorder, and also having a locking screw or pin 91 which is turned in a socket in the partition to lock the mounting base snugly thereto for accurately and rigidly supporting this flat plate in a proper position to accurately form the strip passing gap.

A plurality of such aperture gate plates are provided having different sizes and shapes of apertures and these can be interchangeably selected and conveniently installed in the machine to suit various different operating conditions. Also, as may be seen in Fig. 9, and represented by dotted lines in Fig. 8, the side of this plate toward the gap is provided with raised contact bands 353 spaced along the edges to engage the edges of the moving recording strip 17 so that the mid-portions of the strip are comparatively free. For this purpose a hard surfaced plating of some metal is preferably provided, such as chromium plating which has proven to be very satisfactory. Even as thin a coating of chromium as about five thousandths of an inch is adequate and eliminates a common difficulty with deposits of film material which tend to build up on such a gate plate. Such aperture plates are conveniently interchangeable and also serve the further purpose of regulating the application of varying light upon the film when making records upon light sensitive strips or film. The recording strip 17 is shown in dotted lines in Figs. 7, 8, 9 and 10. In Figs. 7 and 9 the adjacent focusing chamber structure 95 is shown dotted forming the other side of the gap. In Fig. 9 cooperative mounting and securing structure is shown in dotted lines.

Fig. 10, shows a gate plate 87' which is provided for adapting the recorder to utilize recording strip of the magnetic type. This gate plate has the same mounting base with similar mounting and securing means. This gate plate may also have the hard smooth contact bands 353, but instead of having a light controlling aperture the plate is provided with a plurality of the conventional magnetic recording heads 355 which may be the same as commonly used in magnetic recorders. Each such magnetic recording head may comprise a field structure 355 having an energizing winding or coil 359 with wires 361 extended for connection to the output terminals of an amplifier or other source of energization. These magnetic recording heads 355 may be so located in the gate plate 87' as to impress timing or evaluating impressions along the edges of the magnetic recording strip 17 and such recording heads may also impress the transient phenomenon to be observed upon the mid-portion of the strip. In Fig. 28, the operation of making such a magnetic record is illustrated and, as shown, the input terminals of the "Amplifier" are connected by conductors 363 to translating device 365 which may be a sound receiving microphone, a magnetic pick-up coil, an electrostatic condenser, or any other element which can translate the factors to be recorded into corresponding electrical manifestations of the variations of such factors as are to be observed and recorded upon the recording strip as it passes along. Also this view represents a cathode ray tube 367 adjacent the moving record strip 17, which may be a light sensitive film, for recording the transient phenomenon as thereby manifested, or any other translating means able to produce a variable light manifestation of such a phenomenon may be utilized in conjunction with the recorder. Also Fig. 29 further shows how two of the magnetic recording heads 355 may be utilized for impressing evaluating or timing marks upon the moving strip when a magnetic strip is utilized. For example, two such heads may be connected individually to two sources of alternating current 369 of different frequencies selected to suit the desired purposes. Also, as Fig. 29 shows, the recording strip 17 may be a photo film passing by the previously described gaseous flashing lights 117 flashed by connection of these lamps to different alternating electrical sources 369 of different frequencies selected to suit the purposes desired.

Figs. 11 through 16 show a variable aperture plate 371 comprising a pedestal flange or mounting base 89 having pilot pins 93 and a locking pin or screw 91 for snugly and accurately mounting in the recorder body in the same manner as in the aperture and the gate plates previously described, the plate being also provided with an aperture 101 to pass light therethrough. A slight variation of these features in this embodiment, as seen in Fig. 11, consists in the aperture 101 being opened down flush with the mounting base 89 and because of this it was necessary to countersink or embed the slotted head of the locking pin 91 into the base, as shown. Aperture control means is provided consisting of a pair of curtains 373 made of any suitable opaque sheet material, such as thin sheet metal or other material, and mounted movably adjacent the aperture in the plate. Convenient manual control means is provided so that the two curtains 373 can be simultaneously moved together to any desired position toward the center of the aperture 101 to thereby narrow the aperture down as desired, even to a narrow slit or to be completely closed. This is done by means of a threaded shaft 375 which is rotatively mounted adjacent the mounting base with one end exposed and provided with a knurled knob 377 for easy manipulation. One end portion of this shaft 375 is provided with right-hand threads and the other end portion of the shaft is provided with left-hand threads, as more clearly seen in the enlarged view Fig. 15. Corresponding nuts 379 threadably disposed upon these threaded portions of the shaft are secured respectively to the opaque curtains 373 so that the two curtains are simultaneously moved apart or together as the shaft is turned in one direction or the other. For movably supporting these elements in a compact self-contained assembly, the side of the apertured plate 371 toward the moving record strip 17 is recessed sufficiently to form a shallow aperture 381 receiving the thin curtains slidably therein and a shaft receiving groove 383 is provided along in the edge of this plate below the aperture and adjacent the mounting base.

As seen in Fig. 13, two small shaft bearings 385 are provided one on each end of this shaft and inserted into the ends of the groove 383 for freely supporting the shaft therein. Fig. 16 shows one of these small bearings 385, the shaft aperture being shown dotted. These small bearings have a reduced neck 387 to fit into the ends of the shaft groove 383 and a large flange 389 to engage the outer ends to limit movements of these bearings into the shaft groove. The end of the shaft 375 remote from the knurled knob 377 receives a pair of nuts 391 turned tightly together in a locking relation to limit the endwise movement of the shaft while permitting the shaft to rotate freely for adjusting the positions of the curtains.

As seen in Fig. 13, and more clearly in Fig. 15, the mid-portion of this control shaft 375 is provided with a smooth unthreaded portion, which may be made of larger diameter, and the two curtain moving nuts 379 are provided in their adjacently disposed ends with smooth enlarged counter bores 393 which permit these nuts to slide freely over and upon the smooth mid-portion of the shaft as the two curtains are adjusted to positions near the center of the aperture of the plate. The lower edges of the curtains 373 are respectively secured to these curtain moving nuts 379, as by soldering, brazing, or cementing, according to the materials thereof. A cover 395 is secured on the recessed and grooved side of the aperture plate, as by screws 397, and this cover serves to protect the moving parts while holding these parts in a free moving self-contained cooperative relation therein. And, as may be seen in Figs. 11, 13 and 14 this cover is also provided with the raised film contacting bands 353 for slidably engaging the edges of the recording strip to guide the recording strip or film as it moves along and without building up deposits of film material theeron, as explained relative to the previously described aperture plates.

Operation of the transient phenomenon recording apparatus is ready when the recording strip magazine reel unit has been properly installed as previously described with the recording strip threaded through the recorder. Also in starting the apparatus it is important that the other previously described operations have been attended to; such as installing a proper aperture plate in the recorder, mounting the small cover 31 on one side of the recorder body and the large cover 35 on the other side, adjusting the speed control tab 108, and positioning the apparatus relative to the test or phenomenon to be recorded. If light sensitive film is the type of recording strip utilized, then the lens must be properly focused upon the translating means to be observed and even if it is merely a matter of admitting a beam of light through the lens which may merely be a window, there is the matter of properly positioning the apparatus and utilizing a proper size of aperture plate.

Fig. 30 diagrammatically represents the electrical system and will be referred to in tracing the operation of the apparatus. In the lower left-hand corner of this view the six sockets of the terminal plate 47 are symbolically represented by the six circles placed in straight alignment. From left to right these correspond to the plug-in sockets which appear on the terminal plate, as shown in Fig. 23, and marked there by the indicia "SYN," "MKR1," "MKR2," "HTR," "SW" and "PWR," having functional significance, as previously described.

The connections shown below these sockets represent the external connections which may be conveniently plugged into the apparatus, and above these sockets are represented the internal connections which are provided within the recorder body, and partially grounded therethrough, as shown. As shown, the conductors 186 from the pick-up coil 185 and notched wheel are connected internally into the "SYN" socket which is the first circle shown on the left-hand side. From this socket external connection can be plugged in, as represented by dotted lines, and this may be a connection to an amplifier or other external apparatus (not shown) to utilize these impulses as desired.

The second and third sockets, marked MKR1 and MKR2, are internally connected respectively, by conductors 133, to the two flashing lamps 117 which, as previously described, are mounted adjacent the moving film 17 for impressing timing or other evaluating marks upon the moving strip. The two external sources of A.C. energization 369 are represented as plugged into these sockets by conductors 133′ for flashing these lamps at the desired frequencies.

The fourth socket, designated "HTR" is a three contact socket and it is shown plugged to the previously mentioned external three conductor cable 43 which has its other end plugged to the reel magazine, as shown, to apply power to the extreme ends of the two heater elements 341 which are in series, with the thermostat switch 345 connected therebetween. This opens and closes the circuit automatically for heating current from a conductor 401 and maintains a proper temperature for the recording strip in the reel chambers, as previously described. The mid-contact in the socket "HTR" connects from one end of one of the heater elements 341 to ground 402 on the recorder body for completing the heater energizing circuit. The third contact of socket "HTR" connects from the other end of this heater element and goes through the colored signal lamp 38 to a ground, thus putting this signal lamp in parallel with this heater element. This is one of the lamps which is mounted conspicuously upon the side of the recorder body and it serves to show the operator when the reel heater is "on", being a distinctive color for this purpose.

The fifth socket "SW" has one terminal grounded through the yardage switch 273, by suitable internal connections as shown. The other contact of this socket connects by a conductor 403 to controlling relation to relay R1. Also relay R2 is connected in energizing relation from conductor 403 by a conductor 405. Externally plugged into this fifth socket "SW" is a two conductor cable 53 which is provided with a remote end push button 51 which the operator conveniently holds in his hand as he moves about watching the operations of the test to be observed. This push button 51 is a normally open switch and pressing it closes the circuit 403 in series with the yardage switch 273, energizing relays R1 and R2 and causes the apparatus to start.

The sixth socket, marked "PWR" is the main power socket. Into it, as represented in Fig. 30, an external two conductor cable 407 is plugged which connects an external electrical direct current power source 409 into the apparatus to supply the energy for operation of the apparatus. Internally one of the socket terminals is grounded as shown at 411, to utilize the recorder body as one side of the circuit and to thereby simplify the wiring and to reduce the number of wires which must be located and strung through the available space in the recorder body.

Fig. 30 also shows the main driving motor 203 which, as previously described, is a series type motor. As shown it has a winding designated F connected to be energized in series with the armature A the other side of which connects to the ground through the variable resistor 145 and conductor 407 so that the speed of this main motor is controlled by the servo-motor 191 driving the arm 193 over this resistor through a connection which is represented by a dotted line in this diagram. The resistor 197 may be connected in shunt with the armature A of the main motor by a manual switch 409 when especially slow speed operation is desired.

The servo-motor 191 has its armature "*a*" connected to ground, on one side, through a conductor 411 and the other side is connected to the ends of two field windings HI and LO. These two field windings are similar except that one is reversely wound or connected. When the field winding designated HI is energized in series with the armature "*a*" this motor runs in a direction turning the arm 193 so as to decrease the resistance of the resistor 145 in series with the main motor 203 which is thereby caused to run at a higher speed. The other field winding LO of the servo-motor, when energized in series with the armature "*a*" of this motor causes it to run in a reverse direction causing the arm 193 to increase the resistance of resistor 145 in the circuit of the main motor 203 for lower speed operation. This reverse action of the servo-motor 191 is accomplished by energizing the other end of the field winding LO through a conductor 413 connected to a back contact of the relay R2 which is energized when this relay is de-energized and its bridging contact 415 is down. This relay R2 has front contacts closed by a bridging contact 417 so that when the relay R2 is energized and pulled up opening the circuit of field winding LO, another circuit is closed for field winding HI through the front contacts by bridging contact 417 by way of a conductor 419 through the winding HI. This operates the servo-motor to move the arm 193 over resistor 145 in a reverse direction decreasing its resistance in the circuit of the main motor 203 and thus speeding it up.

The relay R2 thus causes the main drive motor 203 to run slower or faster as required. The opposite contacts of each pair of front and back contacts of the relay R2 are connected together through a conductor 421 extending to be bridged through front contact of relay R1 by a bridging contact 423 to connect with line 425 which also connects from the end of field winding F of the main drive motor 203 to be simultaneously energized, this being accomplished by another pair of front contacts bridged by a bridging contact 427 when relay R1 is energized. Thus the two motors are energized simultaneously when the relay R1 is energized and pulls up, this energizing circuit being completed by a conductor 428 through a fuse S and the main manual switch 49 and then by a conductor 429 to the live terminal in the power plug-in socket PWR.

The relay R2, which controls the speed of the main motor, is energized from a conductor 431 through a conductor 173, speed governor contact 171 and conductor 175 to one terminal of this relay winding, from the other end of this winding a conductor 405 connecting to the conductor 403 extending to ground through the control push button 51 on the end of the control cable 53 and then to ground through the yardage switch 273. Thus the contact arm 171 of the speed governor determines whether the relay R2 will pull up or drop down and, as previously explained, this determines the direction the servo-motor will run and in turn, by increasing or decreasing the resistance of resistor 145, this either speeds up main drive motor 203 or slows it down in response to the speed sensing device 103 and its contact 171.

The brake releasing electromagnet 235 is energized through a conductor 241 connected to the bridging contact 417 of relay R2 so that when this relay R2 pulls up for high speed operation the brakeshoe 223 is pulled away from the brake drum 163 in opposition to the spring 239, these elements being diagrammatically represented in cooperative relation in Fig. 30.

The circuits are divided to permit fusing to suit the load requirement, a second fuse S′ being also connected from the main manual switch 49 to a conductor 431 which extends to one terminal of the winding of the relay R1. This conductor 431 also connects to the conductor 401 to supply heating current to the reel magazine heaters 341. And from the other terminal of the winding of the relay R1 the conductor 403 connects to complete the energizing control through the remote hand carried push button 51 and also through the yardage switch 273, as shown.

A "back-up" switch 433, which may be a normally open push button, is connected across between conductors 421 and 428 so that when both relays R1 and R2 are still unenergized, the main manual switch 49 being closed but the push button 51 being open, it is possible to energize the servo-motor 191 through its LO winding causing it to run the resistor arm 193 back toward the slow speed position. This is important because the apparatus is set up to utilize the full cross-sectional strength of the recording strip or film and if an attempt is made to start up when the speed control arm 193 is set away from the slow speed position the result may be to break the recording strip 17. By closing the "back-up" switch 433 the servo-motor is started up through the field winding LO to run the resistor arm 193 back toward a low speed position so that the main drive motor 203 does not tend to apply an excessive starting torque even though the speed control arm 193 may start moving toward the high speed position as soon as the main motor 203 is started by the operator pressing the push button 51 at the end of the control cable 53.

Operation of the electrical control system of Fig. 30 may now be more clearly understood by considering a few complete operating cycles thereof, the cooperative circuit relations of the electrical elements having been previously described. Assume that the socket PWR has the power supply cable 407 plugged therein and that the remote control cable 53 has been plugged into the socket SW. Also assume that the yardage switch 273 has been closed and that the associated instrument has been set to open when the desired length of recording strip has been run. Also assume that the speed governor 103 has been adjusted by the finger tab 108 to open its speed control contact 171 at the upper limit of speed desired.

Closing the main manual switch 49, on the back of the recorder, connects one side of the power source 409 through fuse S′ and conductor 431 to one side of windings of relays R1 and R2, and the other sides of these windings being connected through conductor 403 and control cable 53 to the push button 51 which is open so that operation of the apparatus is not started. But as soon as the operator presses the button 51 the circuit is completed to ground through yardage switch 273 and hence to the other side of the power source 409. This causes relay R1 to pull up and energize both motors, as previously explained, the servo-motor 191 running in a direction to move resistor arm 193 to reduce the resistance in the line of the main motor and to increase its speed. When the apparatus comes up to the predetermined maximum speed the governor contact 171 opens and allows relay R2 to drop back opening the circuit of the servo-motor through field winding HI and closing it through the field winding LO. As explained this reverses the direction of servo-motor 191 and drives the speed control arm 193 so as to increase the resistance of resistor 195 in the main motor circuit, tending to decrease its speed. The governor contact 171 will close again when the speed of the main motor has been reduced a predetermined amount, and then the relay R2 picks up again and runs the servo-motor 191 in the direction to increase the speed of the main motor. This speed regulation of the apparatus continues until finally the desired length of recording strip has been run and the yardage switch 273 opens which deenergizes the control circuits and stops the apparatus, the brake electromagnet 235 being deenergized and the spring 234 setting the brake to bring the apparatus to a quick stop with a minimum waste of recording strip 17. By resetting the yardage switch 273, and its instrument, the recording apparatus may be again started merely by pressing the control button 51. During operation the green lamp 36, mounted on the recorder body, will show that the motor is in operation and this lamp will be extinguished when the motor is deenergized and stopped. As the recording strip 17 moves along the flashing marking lamps 117 may apply timing or evaluating marks along the edges of the recording strip and if magnetic recording strip is utilized then this same function is accomplished by magnetic recording heads, as shown in Figs. 10, 28 and 29.

Fig. 31 shows a variation of the speed control part of the system, only the modified part being shown and the other parts of the system remaining the same as in Fig. 30. The main drive motor 203 is similar to that previously described except that it is provided with two series field windings F1 and F2 and these two windings being energized so as to set up opposing magnetomotive forces as by the manner in which they are wound or connected. The energizing connection from the added opposing field winding F2 to the armature extends by way of a conductor 441 to a fixed resistor 443 of a suitable resistance, then by conductor 445 through the variable resistor 145 of the rheostat controlled by the servo-motor 191 and then by a conductor 447 to the armature A of the driving motor 203. The servo-motor 191 is the same as in Fig. 30 and it is still similarly controlled by the speed sensitive device and contact 171 to run and vary its rheostat resistance in one direction or in the other direction depending upon whether the speed of the driving motor should be increased, or decreased. But the current being controlled by the servo-motor rheostat 145 is now a smaller current and so this rheostat can now be much smaller and it does not have to dissipate so much heat. This is an important advantage in view of the rheostat 145 being mounted and housed in the recorder apparatus. It will be apparent that as the resistance of this rheostat 145 is increased the current in the second field winding F2 of the drive motor will be decreased thus reducing its opposing force and tending to more nearly give full effect to the magnetomotive force set up by the first field winding of this motor thus increasing the field flux and tending to reduce the speed of this motor. When the servo-motor 191 operates in the reverse direction, its rheostat resistance 145 in the circuit is decreased thus increasing the effect of the second series field winding F2 to oppose the first field winding F1. This tends to decrease the field flux set up adjacent the armature and to increase the speed of the driving motor, in a well known manner. The fixed resistor 443 assures that the second field winding F2 will not be fully energized so as to fully oppose or balance out the effect of the first field winding F1 and render the driving motor 203 inoperative. The extra slow speed resistor 197 may be omitted.

Fig. 32 shows still another variation of the speed control arrangement of the system shown in Fig. 30, the other parts remaining the same. In this modification the main drive motor 203 is the same as in Fig. 30 but its drive shaft 209 extends therefrom to one side of an electromagnetic clutch 451, and from the other or output side of this clutch a shaft 209′ extends to drive the drawing reel of the recorder. This electromagnetic clutch 451 is energized by connecting one terminal through a conductor 453 to the line 425 which energizes the drive motor. The other terminal of this clutch is energized by way of a conductor 455 through the variable rheostat 145 the other side of which is grounded by conductor 411 as in the previous systems. As the servo-motor 191 runs in one direction or the other in response to the operations of the speed sensing device, as previously described, this varies the current energizing the electromagnetic clutch 451 and thereby varies the torque transmitted by it to drive the drawing reel of the recorder. A clutch which is especially suitable for this purpose is the magnetic fluid clutch which was developed by the United States Bureau of Standards and which is internally loaded with finely divided magnetizable material, such as iron filings, either dry or mixed with oil or other liquids. Such fluid magnetic clutches are shown and described in various publications such as: Tele-Tech, September 1952, the paper entitled "Fluid Magnetic Clutch for Servomechanisms," on pages 90, 91, 156, 158, 160 and 161; Science and Mechanics, August 1948, the paper entitled "Magnetic Fluid Clutch," on pages 77, 78 and 79. Such a clutch has desirable power transmission characteristics and requires only a relatively small current so that the rheostat 145 can be small in physical size and in electrical capacity and the amount of heat to be dissipated is small, all of which are substantial advantages in making such a small, compact and light weight high speed recording apparatus. Electromagnetic clutches of this kind are well known and are available on the open market.

It is apparent that within the scope of my invention modifications and different arrangements may be made other than herein disclosed, and the present disclosure is illustrative merely, the invention comprehending variations thereof.

What I claim as my invention is:

1. In high-speed recording apparatus for making strip recordings of transient phenomenon, a main support structure, a rotary supply reel support, a rotary drawing reel support, a reel support structure mountable upon said main support structure and supporting said rotary reel supports suitably spaced for receiving a recording strip from a reel on said supply reel support and passing the strip along a predetermined path of travel adjacent said main support structure and returning the strip to a drawing reel on said rotary drawing reel support, said main support structure having a reel drive shaft and a reel brake shaft arranged for cooperative coupling with the rotary reel supports on said reel support structure when it is mounted upon said main support structure, means mounting said reel drive shaft and said reel brake shaft rotatively upon said main support structure with a swivelling action to facilitate cooperative coupling with the rotary reel supports of said reel support structure when the latter is being mounted upon the main support structure, motive means for rotating said reel drive shaft to draw a recording strip along said path of travel, and recording means mounted upon said main support structure adjacent said path of travel for impressing a recording manifestation upon a moving recording strip in accordance with the sensitized condition of the strip and variable in accordance with a transient phenomenon to be recorded, the velocity of movement of the strip providing the time axis of the record so formed.

2. High-speed recording apparatus for making strip recordings of transient phenomenon in accordance with claim 1 and further characterized by said reel support providing an open sided reel enclosing chamber around each one of said two rotary reel supports to enclose reels mounted upon said rotary reel supports, and cooperatively engageable means for accurately mounting and securing said reel support structure upon said main support structure.

3. In high-speed electric recording apparatus for making strip recordings of transient phenomenon, the combination of, a rotary supply reel support, a rotary drawing reel support, a structure supporting said reel supports suitably spaced for receiving a recording strip from a reel on said supply reel support and passing the strip along a predetermined path of travel returning to a drawing reel on said drawing reel support, an electric driving motor for rotating said drawing reel support to draw a recording strip along said predetermined path, recording means adjacent said path of travel for impressing a suitable recording manifestation on the recording strip in accordance with the sensitized condition of the strip and variable in accordance with a transient phenomenon to be recorded on the strip as it passes along said path, the velocity of movement of strip providing the time axis of the record, manual switch means, an energizing circuit for energizing said electric motor through said manual switch means, motor speed control means, speed responsive means operative in accordance with the velocity of the recording strip and connected to actuate said motor speed control means to control the motor speed within a desired speed range, recording strip length measuring device, contacts actuated by said device and disposed to deenergize said energizing circuit and stop the motor after drawing a desired predetermined length of the recording strip, and brake means for retarding the motion of the recording strip when the motor is deenergized.

4. In high-speed strip recording apparatus for making strip recordings of transient phenomenon the combination of, a base body supporting and enclosing structure comprising four enclosing peripheral walls disposed in a peripheral space enclosing relation, a partition dividing said space and apertured for supporting apparatus elements therethrough and on both sides thereof while also lending rigidity to the body structure, an electric driving motor supported from and through said partition, one of said enclosing walls having the outer exposed surface conformed to provide a mounting area for receiving and mounting a reel magazine unit in an accurate cooperative position thereon for supplying a recording strip to pass along a predetermined path in said base body structure, guide means in said body for guiding a recording strip to pass along said predetermined path therein, recording means adjacent said path for applying a suitable recording manifestation upon a recording strip moving along said path in accordance with the sensitized nature of the strip for recording a transient phenomenon thereon, a driving connection extending from said driving motor and exposed externally adjacent said mounting area for coupling with a strip reel mounted thereon, speed control means controlling the speed of a reel driven therefrom, and driving means for actuating said speed control means in accordance with the speed of a strip moving along said path for regulating the speed of the driven reel.

5. High-speed strip recording apparatus in accordance with claim 4 and further characterized by said speed control means being mounted in said partition for convenient driving connection with the recording strip on one side of the partition and for convenience in extending connections on the other side of the partition for controlling the speed of the driven reel.

6. High-speed recording apparatus in accordance with claim 4 and further characterized by the base body structure being a casting of a lightweight metal for effective strength, rigidity, lightweight and effective shielding.

7. High-speed recording apparatus in accordance with claim 6 and further characterized by said body having integral cast side wall means partially closing one side of the body, a small front metal cover fitting snugly upon the side edges of said enclosing walls for closing said one side of the body, and a large metal rear cover fitting snugly on opposite edges of said enclosing walls for closing the opposite side of the body.

8. In a high-speed recording apparatus for making strip recordings of transient phenomenon, the combination of, a rotary supply reel support, a rotary drawing reel support, a support structure supporting said reel supports suitably spaced for receiving a recording strip from a reel on said supply reel support and passing the strip along a predetermined path of travel returning to a drawing reel on said drawing reel support, motive means for rotating said drawing reel support to draw a recording strip along said predetermined path, recording means adjacent said path of travel for impressing a suitable recording manifestation in accordance with the sensitized condition of the strip and variable in accordance with a transient phenomenon to be recorded on the strip as it passes along said path, the velocity of movement of the strip providing the time axis of the record, transient responsive means for providing recording impulses, an amplifier, conductive means impressing said impulses upon the input of said amplifier, impulse recording means disposed to influence a sensitized recording strip, and conductive means connecting from the output of said amplifier for energizing said impulse recording means to correspondingly affect the strip as it moves along.

9. High-speed recording apparatus in accordance with claim 8 and further characterized by having a manually settable indicating and control instrument responsive to the movement of said recording strip, indicating means actuated by said instrument to show the length of the recording strip which has passed and control means actuable when a desired length of recording strip has passed for stopping the driving motor.

10. In high-speed recording apparatus for making strip recordings of transient phenomenon, the combination of, a rotary supply reel support, a rotary drawing reel support, support structure supporting said reel supports suitably spaced for receiving a recording strip from a reel on said supply reel support and passing the strip along a predetermined path of travel returning to a drawing reel on said drawing reel support, an electric driving motor for rotating said drawing reel support to draw a recording strip along said predetermined path, recording means adjacent said predetermined path of travel of a recording strip for impressing a suitable recording manifestation upon the strip in accordance with the sensitized condition of the strip and variable in accord with a transient phenomenon to be recorded as the strip passes along said path, its movement providing the time axis of the record, a brake drum secured to and rotating with said rotary supply reel support, a brake shoe means movably mounting said brake shoe for control to retard or release the rotary movement of said brake drum, an electromagnet operating means actuated by said electromagnet and connected so that by controlling the energization of the electromagnet the brake shoe can be conveniently applied or released in conjunction with other controls, and auxiliary braking means applying a light braking force tending to retard rotation of said brake drum at all times.

11. In high-speed recording apparatus for making strip recordings of transient phenomenon, the combination of, a rotary supply reel support, a rotary drawing reel support, support structure supporting said reel supports suitably spaced for receiving a recording strip from a reel on said supply reel support and passing the strip along a predetermined path of travel returning to a drawing reel on said drawing reel support, an electric driving motor for rotating said drawing reel support to draw a recording strip along said predetermined path, recording means adjacent said predetermined path of travel of a recording strip for impressing a suitable recording manifestation upon the strip in accordance with the sensitized condition of the strip and variable in accord with a transient phenomenon to be recorded as the strip passes along said path, its movement providing the time axis of the record, speed responsive means operable in accordance with the velocity of movement of a recording strip passing along said path of travel, speed contacts operated by said speed responsive means at a desired speed, a servomotor reversibly controlled by the operation of said speed contacts by said speed responsive device, a variable resistance element varied by said servomotor to provide a higher resistance or a lower resistance accordingly as said servomotor operates in one direction or in the other direction, and electric conductive means extending from said variable resistance element to apply its varying resistance to control speed of rotation of said drawing reel accordingly, to provide a constant strip velocity.

12. Recording apparatus in accordance with claim 11 and having manual switch means connected into the system for independently controlling said servomotor so it can be run in a suitable direction for setting said variable resistance element to a value for the slow speed operation of said drawing reel, preparatory to starting up the recording apparatus.

13. High-speed recording apparatus for making strip recordings of transient phenomenon in accordance with claim 11 and further characterized by said electrical conductive means extending from said variable resistance element to connect the latter into the main energizing circuit of said electric driving motor.

14. High-speed recording apparatus for making strip recordings of transient phenomenon in accordance with claim 11 and further characterized by said electric driving motor having two field windings, circuit means energizing said two field windings in opposition, and said electrical conductive means extending from said variable resistance element into the energizing circuit of one of said field windings on said driving motor to control the speed of the driving motor accordingly.

15. High-speed recording apparatus for making strip recordings of transient phenomenon in accordance with claim 11 and further characterized by having an electromagnetic clutch in driving relation between said driving motor and said rotary drawing reel support, an electrical energizing circuit for said clutch, and said electrically conductive means extending from said variable resistance element into the clutch energizing circuit to energize said electromagnetic clutch to transmit driving power in accordance with the desired speed of motion of the recording strip.

16. In high-speed recording apparatus for making strip recordings of transient phenomenon, a main support structure, a rotary supply reel support, a rotary drawing reel support, a reel support structure mountable upon said main support structure and supporting said rotary reel supports suitably spaced for receiving a recording strip from a reel on said supply reel support and passing the strip along a predetermined path of travel adjacent said main support structure and returning the strip to a drawing reel on said rotary drawing reel support, said main support structure having a reel drive shaft and a reel brake shaft arranged for cooperative coupling with the rotary reel supports on said support structure when it is mounted upon said main support structure, means mounting said reel drive shaft and said reel brake shaft rotatively upon said main support structure with a swivelling action to facilitate cooperative coupling with the rotory reel supports of said reel support structure when the latter is being mounted upon the main support structure, means for drawing a recording strip along said path of travel including means for rotating said reel drive shaft, and recording means mounted upon said main support structure adjacent said path of travel for impressing a recording manifestation upon the recording strip in accordance with the sensitized condition of the strip and variable in accordance with a transient phenomenon to be recorded.

17. In high-speed electric recording apparatus for making strip recordings of transient phenomenon, the combination of, a rotary supply reel support, a rotary drawing reel support, a structure supporting said reel supports suitably spaced for receiving a recording strip from a reel on said supply reel support and passing the strip along a predetermined path of travel returning to a drawing reel on said drawing reel support, an electric driving motor for rotating said drawing reel support and drawing a recording strip along said predetermined path, recording means adjacent said path of travel for impressing a suitable recording manifestation on the recording strip in accordance with the sensitized condition of the strip and variable in accordance with a transient phenomenon to be recorded on the strip as it passes along said path, manual switch means, an energizing circuit for energizing said electric motor through said manual switch means, recording strip length measuring device, contacts actuated by said device and disposed to deenergize said energizing circuit and stop the motor after drawing a desired predetermined length of the recording strip, and brake means for retarding the motion of the recording strip when the motor is deenergized.

(References on following page)

References Cited in the file of this patent

UNITED STATES PATENTS

| | | |
|---|---|---|
| 665,175 | Carpenter | Jan. 1, 1901 |
| 1,270,265 | Catucci | June 25, 1918 |
| 1,390,247 | Leonard | Sept. 6, 1921 |
| 1,878,693 | Gamble | Sept. 20, 1932 |
| 1,954,255 | Moreno | Apr. 10, 1934 |
| 1,957,974 | Moreno | May 8, 1934 |
| 2,007,468 | Fear | July 9, 1935 |
| 2,061,177 | Tasker | Nov. 17, 1936 |
| 2,073,627 | Draeger | Mar. 16, 1937 |
| 2,126,299 | Wittel et al. | Aug. 9, 1938 |
| 2,174,194 | Nemnich | Sept. 26, 1939 |
| 2,275,497 | Berndt | Mar. 10, 1942 |
| 2,601,051 | Nielsen | June 17, 1952 |
| 2,604,376 | Tuttle et al. | July 22, 1952 |
| 2,629,646 | Warrick | Feb. 24, 1953 |
| 2,726,919 | Hathaway et al. | Dec. 13, 1955 |